(12) United States Patent
Maguire

(10) Patent No.: US 9,188,118 B2
(45) Date of Patent: Nov. 17, 2015

(54) INJECTION MOLDED DIAPHRAGM PUMP FOR LIQUID COLOR WITH QUICK RELEASE

(71) Applicant: Stephen B. Maguire, West Chester, PA (US)

(72) Inventor: Stephen B. Maguire, West Chester, PA (US)

(*) Notice: Subject to any disclaimer, the term of this patent is extended or adjusted under 35 U.S.C. 154(b) by 0 days.

(21) Appl. No.: 13/913,375

(22) Filed: Jun. 7, 2013

(65) Prior Publication Data

US 2013/0334258 A1    Dec. 19, 2013

Related U.S. Application Data

(60) Provisional application No. 61/660,326, filed on Jun. 15, 2012.

(51) Int. Cl.
| | |
|---|---|
| *G01F 11/00* | (2006.01) |
| *F04B 43/02* | (2006.01) |
| *A47K 5/12* | (2006.01) |
| *F16N 13/16* | (2006.01) |
| *B05C 17/01* | (2006.01) |
| *F04B 43/04* | (2006.01) |
| *F04B 49/06* | (2006.01) |

(52) U.S. Cl.
CPC ............... *F04B 43/02* (2013.01); *A47K 5/1217* (2013.01); *B05C 17/0103* (2013.01); *F04B 43/04* (2013.01); *F04B 49/06* (2013.01); *F16N 13/16* (2013.01)

(58) Field of Classification Search
CPC .. F16N 13/16; B05C 17/0103; A47K 5/1217; F04B 43/04; F04B 49/06

USPC ............... 222/52, 63, 383.1, 385, 321.9, 333, 222/334; 417/395, 413.1
See application file for complete search history.

(56) References Cited

U.S. PATENT DOCUMENTS

| | | |
|---|---|---|
| 600,233 A | 3/1898 | Palm |
| 1,451,759 A | 4/1923 | Bruhn |
| 1,489,348 A | 4/1924 | Hampton |
| 2,188,646 A | 1/1940 | Bunch |
| 2,199,657 A | 5/1940 | Bunch |
| 2,387,233 A | 10/1945 | Clapp |
| 2,606,696 A | 8/1952 | Miner |
| 2,656,828 A | 10/1953 | Conover |
| 2,665,825 A | 1/1954 | Poitras et al. |

(Continued)

FOREIGN PATENT DOCUMENTS

| | | |
|---|---|---|
| DE | 3433693 A1 | 3/1986 |
| FR | 1 477 595 A | 4/1967 |

(Continued)

OTHER PUBLICATIONS

Forty-four page two-sided brochure including cover and back pages entitled "Maguire: Auxiliary equipment for the plastics industry" of Maguire Products, Inc., Oct. 2000.

(Continued)

*Primary Examiner* — Frederick C Nicolas
(74) *Attorney, Agent, or Firm* — Charles N. Quinn; Fox Rothschild LLP

(57) ABSTRACT

A pneumatically powered pump for liquid color adapted to fit partially within a liquid color container having a body portion of the pump within the liquid color container adapted to be mounted on the underside of the container lid and being a single piece of molded plastic overlying an aperture in the container lid.

5 Claims, 9 Drawing Sheets

(56) References Cited

U.S. PATENT DOCUMENTS

| | | |
|---|---|---|
| 2,701,881 A | 2/1955 | McGee |
| 2,873,892 A | 2/1959 | Nelson et al. |
| 2,909,315 A | 10/1959 | Sampietro |
| 3,391,645 A | 7/1968 | Koza |
| 3,477,698 A | 11/1969 | Smith et al. |
| 3,518,033 A | 6/1970 | Anderson |
| 3,785,412 A | 1/1974 | Stone |
| 3,814,388 A | 6/1974 | Jakob |
| 3,883,275 A | 5/1975 | Browne |
| 3,957,399 A | 5/1976 | Siczek |
| 3,988,088 A | 10/1976 | King et al. |
| 3,998,103 A | 12/1976 | Bjorklund et al. |
| 4,185,948 A | 1/1980 | Maguire |
| 4,469,127 A * | 9/1984 | Kitamura .................. 137/554 |
| 4,473,173 A | 9/1984 | DeGroff et al. |
| 4,501,405 A | 2/1985 | Usry |
| 4,571,416 A | 2/1986 | Jarzombeck et al. |
| 4,586,882 A | 5/1986 | Tseng |
| 4,605,297 A | 8/1986 | Livingston et al. |
| 4,606,710 A | 8/1986 | Maguire |
| 4,621,990 A | 11/1986 | Forsythe et al. |
| 4,657,490 A | 4/1987 | Abbott |
| 4,834,071 A * | 5/1989 | Hosoi et al. .................. 600/180 |
| 4,967,940 A | 11/1990 | Blette et al. |
| 5,039,279 A | 8/1991 | Natwick et al. |
| 5,116,547 A | 5/1992 | Tsukahara et al. |
| 5,199,852 A | 4/1993 | Danby |
| 5,215,215 A | 6/1993 | Sauer |
| 5,225,210 A | 7/1993 | Shimoda |
| 5,344,232 A | 9/1994 | Nelson et al. |
| 5,364,242 A | 11/1994 | Olsen |
| 5,853,244 A | 12/1998 | Hoff et al. |
| 5,953,923 A | 9/1999 | Davies |
| 5,980,490 A | 11/1999 | Tsoukalis |
| 5,988,983 A | 11/1999 | Furusawa |
| 6,007,236 A | 12/1999 | Maguire |
| 6,057,514 A | 5/2000 | Maguire |
| 6,188,936 B1 | 2/2001 | Maguire et al. |
| 6,213,739 B1 | 4/2001 | Phallen et al. |
| 6,386,841 B1 | 5/2002 | Probst |
| 6,402,363 B1 | 6/2002 | Maguire |
| 6,502,013 B1 | 12/2002 | Sosnik |
| 6,599,005 B2 | 7/2003 | van Der Wei |
| 6,669,358 B2 | 12/2003 | Shimoda |
| 6,719,453 B2 | 4/2004 | Cosman et al. |
| 6,880,965 B1 | 4/2005 | Sheffield, Jr. |
| 6,991,004 B2 | 1/2006 | Kaufhold et al. |
| 7,118,349 B2 | 10/2006 | Oglesby |
| 7,154,069 B1 | 12/2006 | Gordon |
| 7,390,119 B2 * | 6/2008 | Maguire .................. 366/141 |
| 7,416,096 B2 * | 8/2008 | Maguire .................. 222/334 |
| 7,958,915 B2 | 6/2011 | Maguire |
| 7,980,834 B2 | 7/2011 | Maguire |
| 8,800,821 B2 | 8/2014 | Maguire et al. |
| 2002/0023449 A1 | 2/2002 | Park et al. |
| 2002/0031822 A1 | 3/2002 | Van Der Wei et al. |
| 2003/0142580 A1 | 7/2003 | Maguire |
| 2003/0218014 A1 | 11/2003 | Gregory et al. |
| 2005/0052945 A1 | 3/2005 | Maguire |
| 2006/0067844 A1 | 3/2006 | Iversen |
| 2007/0071624 A1 | 3/2007 | Brewer |
| 2011/0200464 A1 | 8/2011 | Maguire et al. |
| 2012/0260992 A1 | 10/2012 | Maguire |
| 2014/0147288 A1 | 5/2014 | Maguire |
| 2014/0224830 A1 | 8/2014 | Maguire |
| 2015/0020713 A1 | 1/2015 | Maguire |
| 2015/0066794 A1 | 3/2015 | Maguire et al. |
| 2015/0108748 A1 | 4/2015 | Maguire |
| 2015/0165662 A1 | 6/2015 | Maguire |

FOREIGN PATENT DOCUMENTS

| | | |
|---|---|---|
| GB | 1145752 | 3/1969 |
| JP | 3550699 B2 | 8/2004 |
| WO | WO 01/49374 A1 | 7/2001 |
| WO | WO 2015/089499 | 6/2015 |

OTHER PUBLICATIONS

Two-sided color brochure entitled Maguire: Model MPA Liquid Color Pump , Maguire Products, Inc., published Dec. 28, 1995.
International Search Report for PCT/US02/02934, dated Feb. 20, 2003.
Written Opinion for PCT/US02/02934, dated Mar. 24, 2003.
International Search Report for PCT/US11/021994, dated May 24, 2011.
Written Opinion for PCT/US11/021994, dated May 24, 2011.
Thirty-two page catalog entitled "Maguire Color Blending Equipment" published by Maguire Products, Inc., 1993, United States.
International Search Report for PCT/US2014/070264 dated Apr. 15, 2015.
Written Opinion for PCT/US2014/070264 dated Apr. 15, 2015.

* cited by examiner

INJECTION MOLDED DIAPHRAGM PUMP FOR LIQUID COLOR WITH QUICK RELEASE

CROSS-REFERENCE TO RELATED PATENT APPLICATION

This patent application claims the benefit of the priority under 35 USC 119 and 35 USC 120 of provisional U.S. patent application Ser. No. 61/660,326 filed 15 Jun. 2012 in the name of "Stephen B. Maguire" and entitled "Molded Diaphragm Pump."

BACKGROUND OF THE INVENTION

1. Field of the Invention

This invention relates to liquid color used to color molded and extruded plastic parts during fabrication thereof, and more particularly relates to diaphragm pumps for pumping liquid color, and even more specifically to diaphragm pumps for pumping liquid color where the pump has a molded pump body and is equipped with a quick release mechanism so that the pump can be quickly removed from a container of liquid color to which the pump is attached, for rapid changeover when the liquid color container is empty, or a change in color is desired.

2. Description of the Prior Art

Pumps for liquid color are known, with one such pump being disclosed in U.S. Pat. No. 7,416,096, with another being disclosed in U.S. Pat. No. 7,980,834, and yet another being disclosed in United States patent application publication 2011/0200464. The disclosures of U.S. Pat. No. 7,416,096, U.S. Pat. No. 7,980,834, and United States patent application publication 2011/0200464 are hereby incorporated by reference.

The '096 patent discloses a container of liquid color material having a diaphragm liquid color pump located in the container for providing liquid color from the container. The diaphragm liquid color pump is located in the container at the container bottom, where the pump can collect liquid color as the container empties. The pump is driven by a pneumatic piston-cylinder combination located outside the container, with a shaft extending downwardly from the pneumatic piston-cylinder combination to the diaphragm pump, to reciprocate the diaphragm back and forth to effectuate pumping action.

The apparatus disclosed in '096 is relatively low in cost. The apparatus includes a liquid-tight fitting allowing the liquid color output from the pump to be supplied directly to a plastics material processing machine, for the liquid color to impart color directly to plastic parts as they are manufactured.

The '834 apparatus provides pressure boosting, permitting liquid color to be injected into an extruder screw or a molding machine screw barrel at a position downstream from the throat, closer to the position at which the finished plastic parts are molded or extruded.

Published application 2011/0200464 discloses a disposable low-cost pump in a container for liquid color, where the pump is fabricated from a plurality of PVC tubular members connected in a way to provide a pumping chamber. A piston is displaceable into the pumping chamber. A spring biases the piston outwardly from the chamber, in opposition to force applied by an air cylinder.

While these devices have merit and have proved commercially successful, there is a continuing need for lower cost, higher reliability apparatus to provide liquid color from liquid color containers to injection and compression molding machines and to extruders, to color plastic parts in the course of manufacture thereof. Moreover, there is a need to regulate flow of liquid color by regulating the pump in order to provide the most accurate flow of liquid color into the molding machine or extruder.

While disposable pumps for liquid color are known in the sense that those pumps can be removed from the liquid color containers and discarded, there is a need for a pump that fits integrally with a liquid color container in a manner to be a part of the container so that the complete assembled pump cannot be removed without compromising the container and leaving an open hole. This is to discourage pump scavenging.

There is a further need in practice, which is somewhat inconsistent with the foregoing, for the relatively high cost portions of the pump to be easily and quickly removable once the container has been emptied, so that those high cost portions of the pump may be used with a new, full container of liquid color, while low cost portions of the pump remain with an empty container to prevent flow of any remaining liquid color out of the container, so that these low cost portions of the pump may be used when the container is refilled, and the pump is reassembled to pump liquid color from the new container.

SUMMARY OF THE INVENTION

In one of its aspects, this invention provides a diaphragm pump for liquid color, where a body portion of the pump is molded and formed of a single piece of plastic. The molded body portion of the pump is preferably incorporated into the liquid color container lid as a part of the container design. The diaphragm portion of the pump, when in operation moves from an unflexed "rest" or "up" position to a flexed "down" position, with total movement at the diaphragm center desirably being in the order of about one-quarter of an inch.

In a preferred embodiment manifesting aspects of the invention, the thickness of the container lid is used to provide space for the diaphragm, with the diaphragm being located in space created by removal of a portion of the container lid. The molded body portion of the pump and the diaphragm are mounted on the bottom side of the container lid. The space created by removal of a portion of the container lid allows the diaphragm to flex upwardly into the space as needed.

The diaphragm is preferably powered by air supplied through a quick disconnect fitting, allowing an air supply to be easily connected and removed so that an empty liquid color container can be removed and replaced by a fresh container filled with liquid color. The quick disconnect fitting can be quickly connected to the fresh container having a similar diaphragm and molded pump body portion in place, and liquid color pumping quickly resumes.

The pump desirably includes a potentiometer, preferably a linear potentiometer, allowing detection of diaphragm movement and accurate control of the pump using a feedback signal provided to a controller, preferably a microprocessor.

In yet another one of its aspects, this invention provides a liquid color container having a pneumatic pump, where the container has a lid with an aperture therein. An integral molded plastic one-piece pump lower body portion resides within the container and is connected to the lid. A diaphragm is sandwiched between the integral molded plastic one-piece pump lower body portion and the lid, in a location to overlie the aperture in the lid. The diaphragm is moveable away from the lid responsively to preferable pneumatic pressure applied to a side of the diaphragm facing the lid and is moveable towards the lid and into the aperture in the lid upon relief of such pneumatic pressure.

DESCRIPTION OF THE PREFERRED EMBODIMENT AND BEST MODE KNOWN FOR PRACTICE OF THE INVENTION

Figure 1:
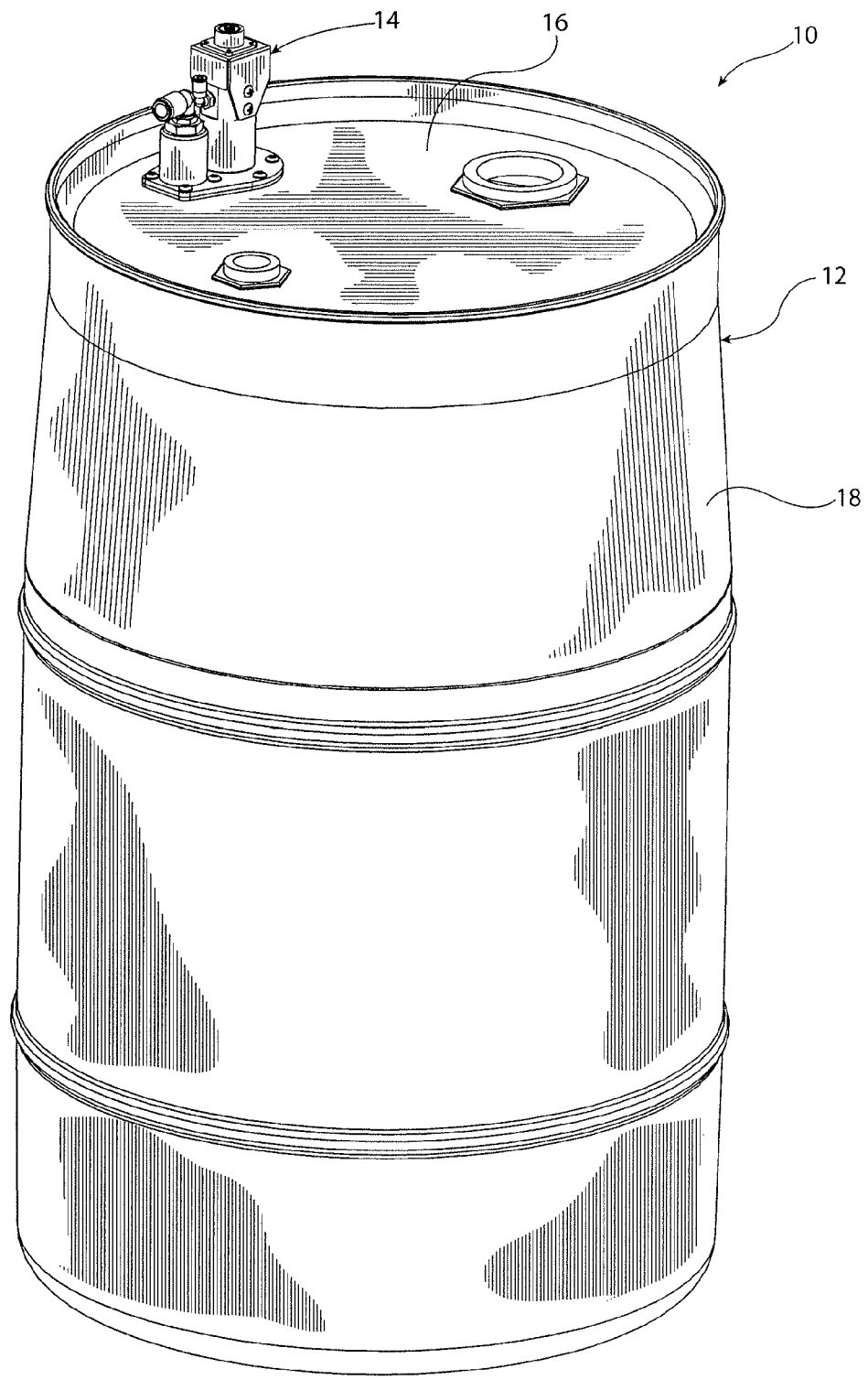
FIG. 1 is an isometric front view of a liquid color container having an injection molded diaphragm pump for liquid color with quick release in accordance with aspects of the invention.
Figure 2:
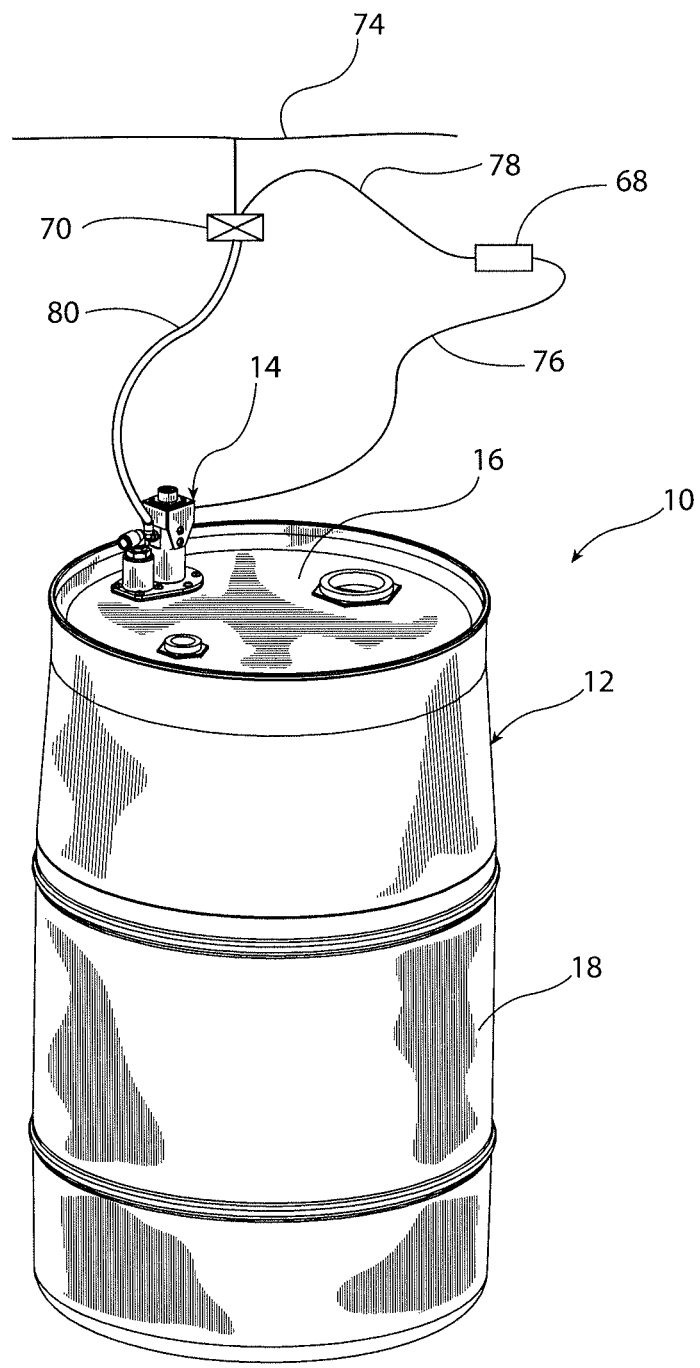
FIG. 2 is an isometric front view of the liquid color container having an injection molded diaphragm pump for liquid color with quick release in accordance with the aspects of the invention as illustrated in FIG. 1, with a microprocessor and a solenoid valve for controlling the pump being shown schematically.

Referring to the drawings in general and specifically to FIGS. 1 and 2, a liquid color container with a pneumatic pump is illustrated in FIGS. 1 and 2, where the pump-drum assembly is designated generally 10, the drum is designated generally 12 and the pump is generally designated generally 14. Drum 12 includes a drum lid 16 and a drum cylindrical body 18 both as illustrated in FIGS. 1 and 2.

Figure 3:
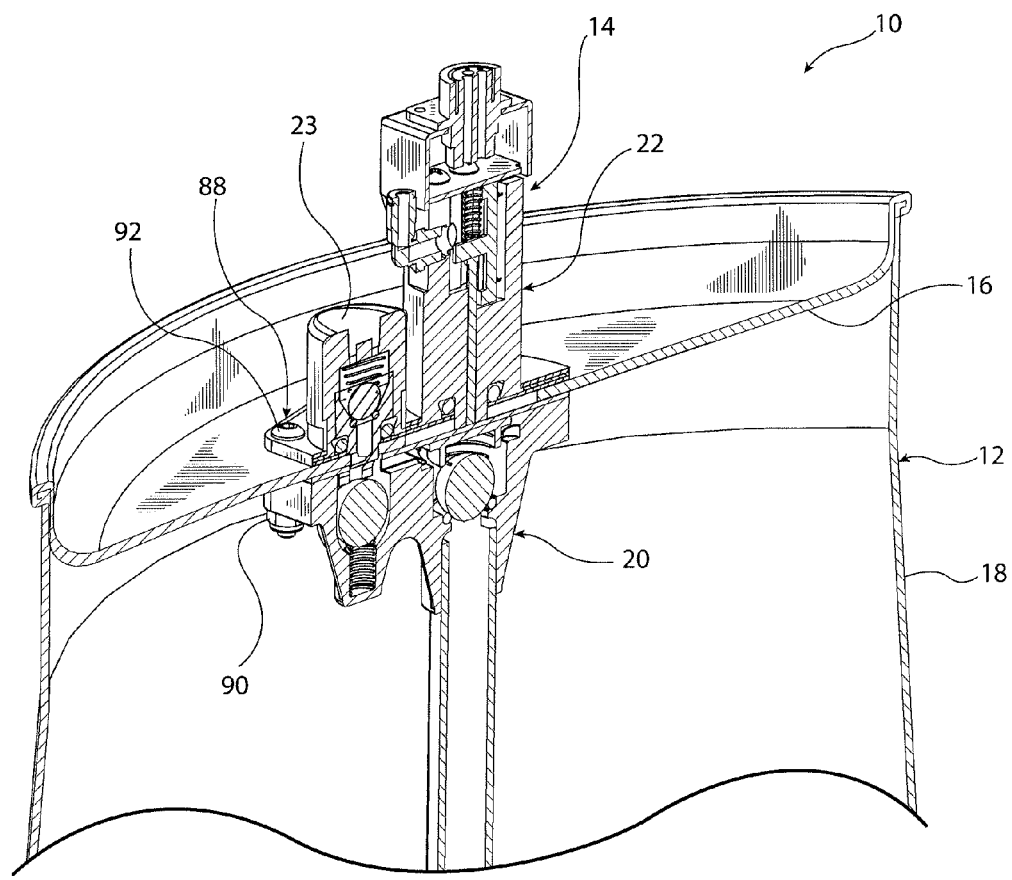
FIG. 3 is an isometric sectional view of the liquid color container having an injection molded diaphragm pump for liquid color with quick release in accordance with the invention as illustrated in FIGS. 1 and 2.
Figure 4:
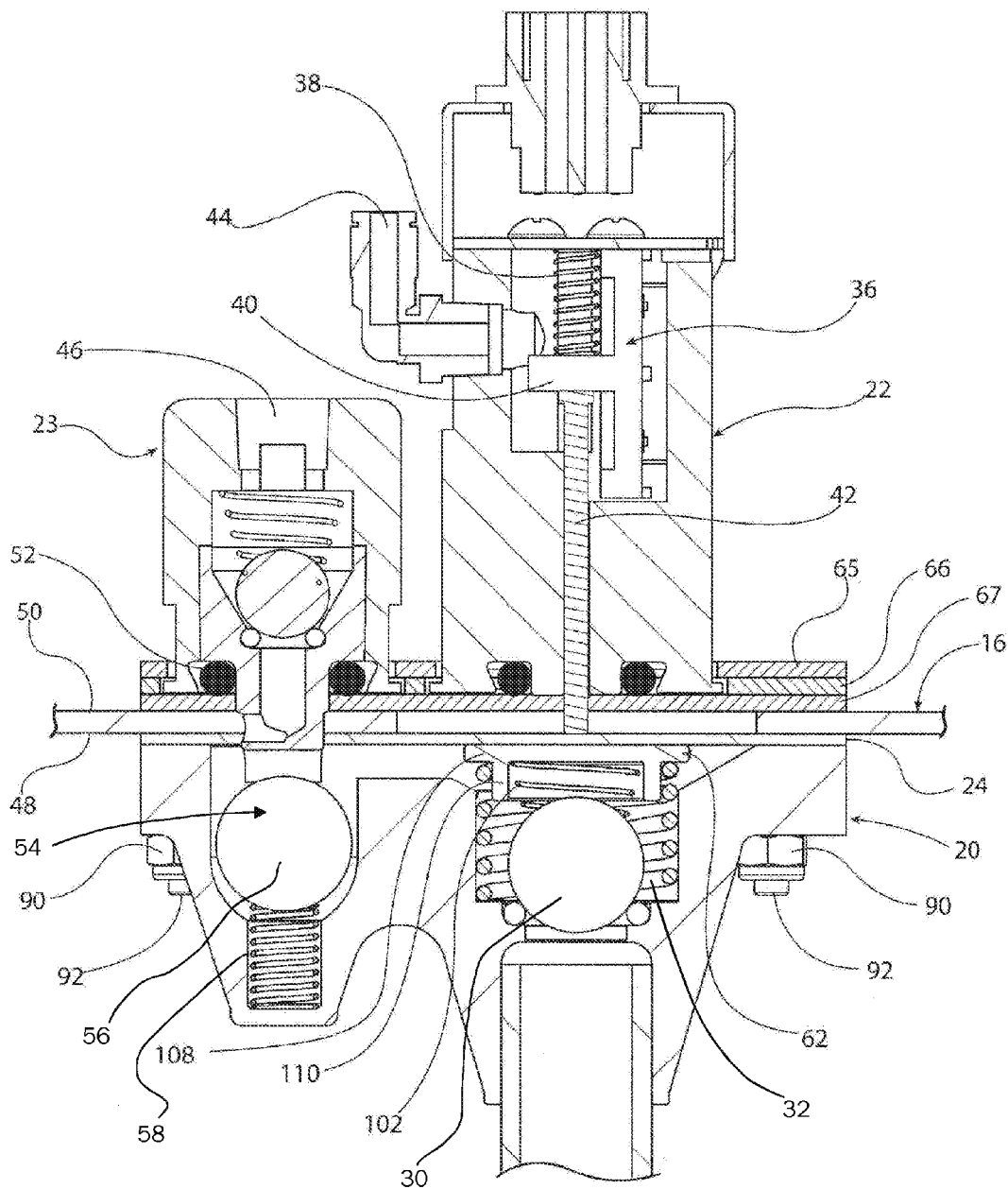
FIG. 4 is an enlarged broken isometric sectional view of the injection molded diaphragm pump for liquid color with quick release as illustrated in FIGS. 1, 2 and 3, with the pump mounted on the lid of the liquid color container and the liquid color container lid shown fragmentally.
Figure 5:
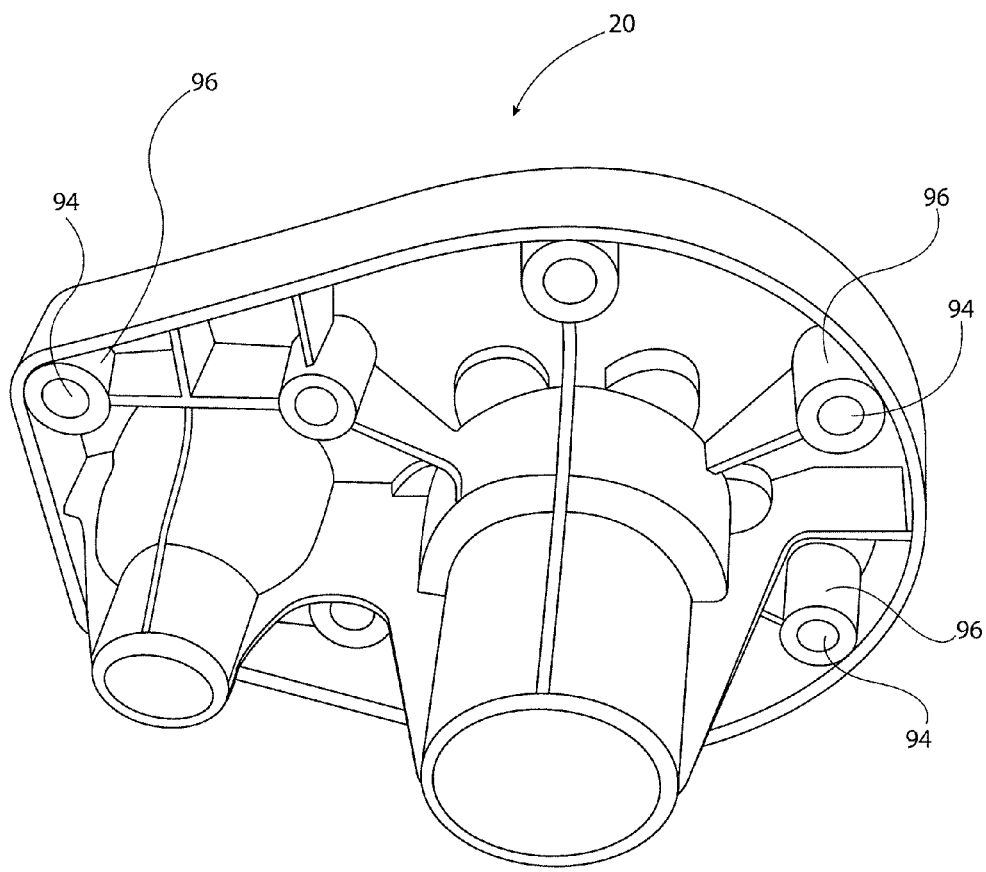
FIG. 5 is an isometric view of the molded plastic one piece lower body portion of the injection molded diaphragm pump illustrated in FIGS. 1 through 4.
Figure 6:
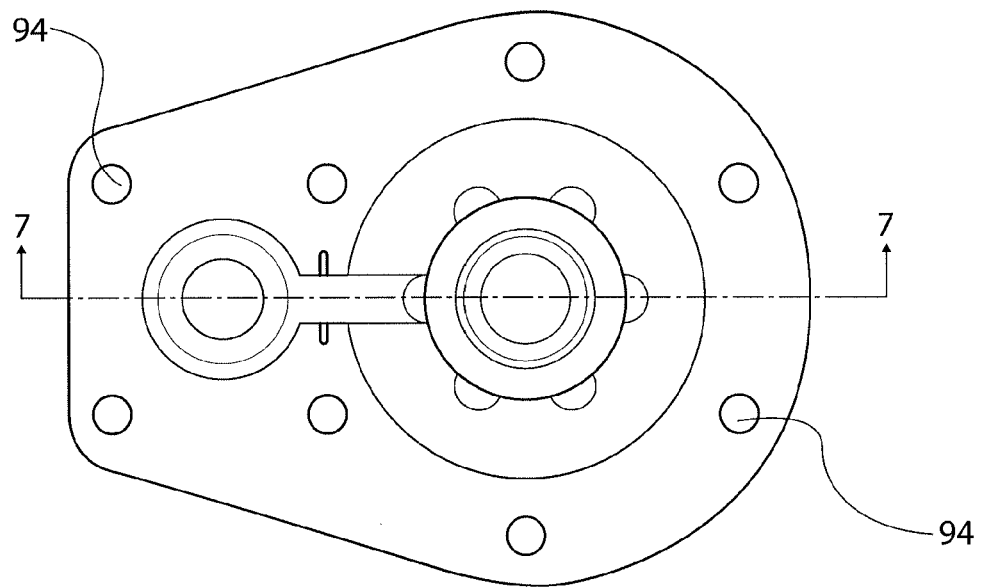
FIG. 6 is a bottom view of the molded plastic one piece lower body portion of the injection molded diaphragm pump illustrated in FIG. 5.

Referring to FIGS. 3 and 4, pump 14 is mounted on lid 16 and secured thereto by nut and bolt combinations 88, one of which is illustrated in FIG. 3. Each nut and bolt combination 88 includes a nut 90 and a bolt 92, with the head of bolt 92 being exterior of drum 12 and nut 90 being within drum 12.

Still referring to FIG. 3 and to FIG. 4, pump 14 includes a pump inlet section 22, a pump outlet section 23, and a molded one piece lower body portion 20.

As illustrated in FIG. 3, bolts 92 pass through a collection of sandwiched plates, described in more detail below, that provide a quick release for pump inlet section 22 and pump outlet section 23, with bolts 92 further passing through an aperture in drum lid 16 and suitable openings 94 in molded one piece lower body portion 20 of pump 14. Openings 94 are formed in bosses 96 which result as one piece lower body portion 20 is molded. One piece lower body portion 20 is a single molded piece of plastic of integral construction. There is no assembly or fabrication activity involved as respecting finishing one piece lower body portion 20 and making it ready for incorporation into pump 14 once one piece lower body portion 20 is ejected from the mold of an injection molding machine. The only finishing that may occasionally be necessary is removal of any flash resulting from the molding process. Polyethylene is one preferred polymer for molding lower body portion 20.

Figure 7:
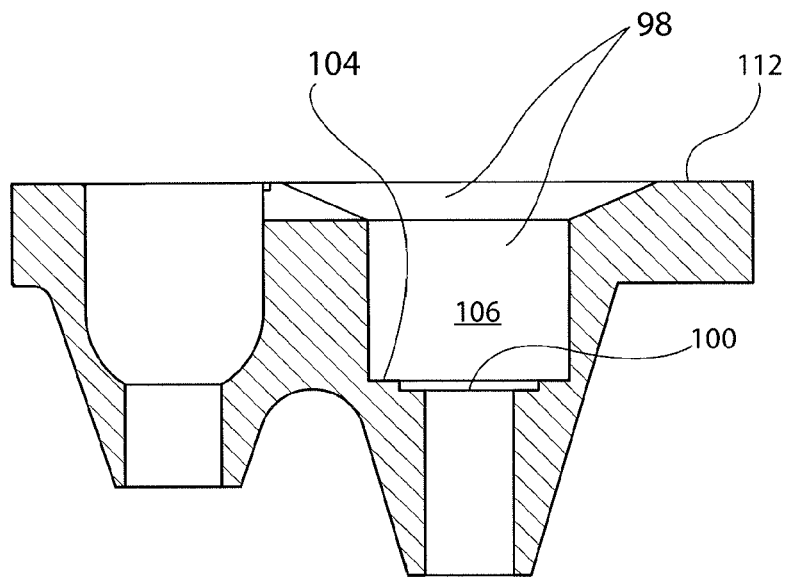
FIG. 7 is a sectional view taken along lines and arrows 7-7 in FIG. 6 of the molded plastic one piece lower body portion of the injection molded diaphragm pump illustrated in FIG. 5.
Figure 8:
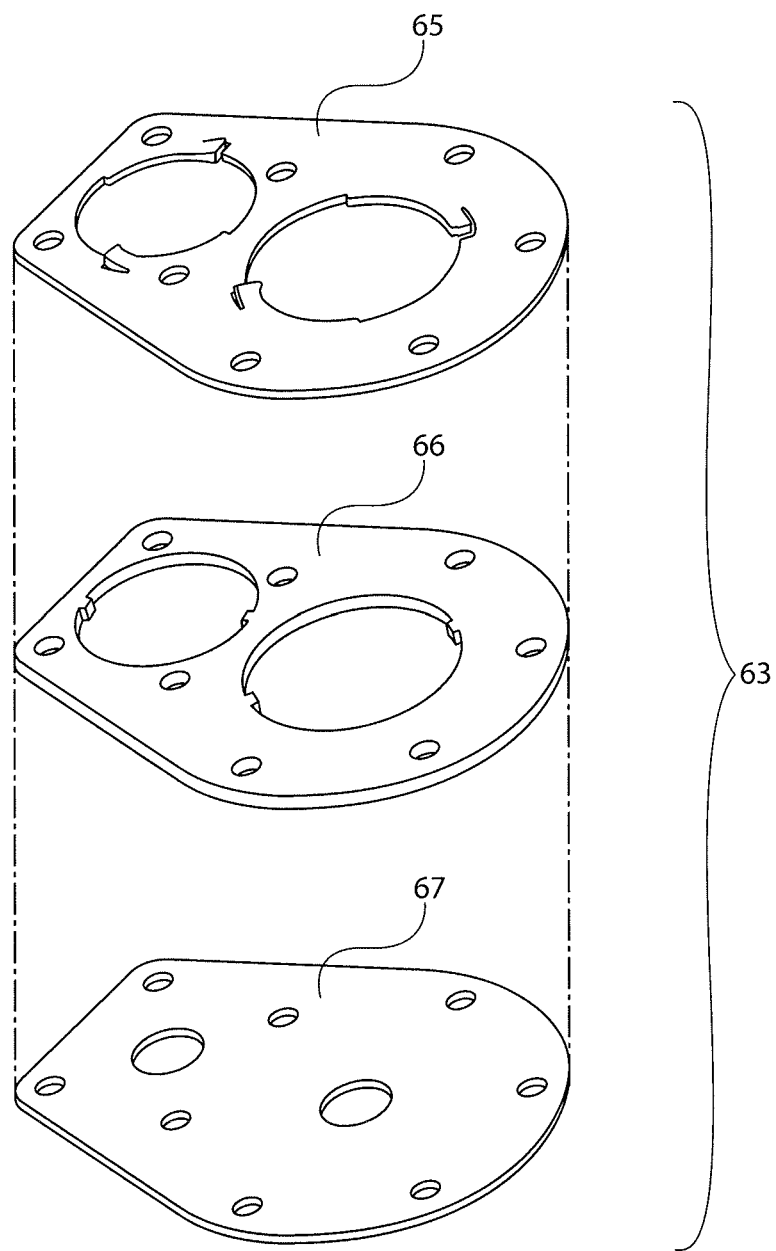
FIG. 8 is an exploded isometric schematic view of a sandwich-type quick disconnect plate assembly showing, from top to bottom, a quick disconnect retainer plate, a quick disconnect spacer plate, and a quick disconnect base plate.
Figure 9:
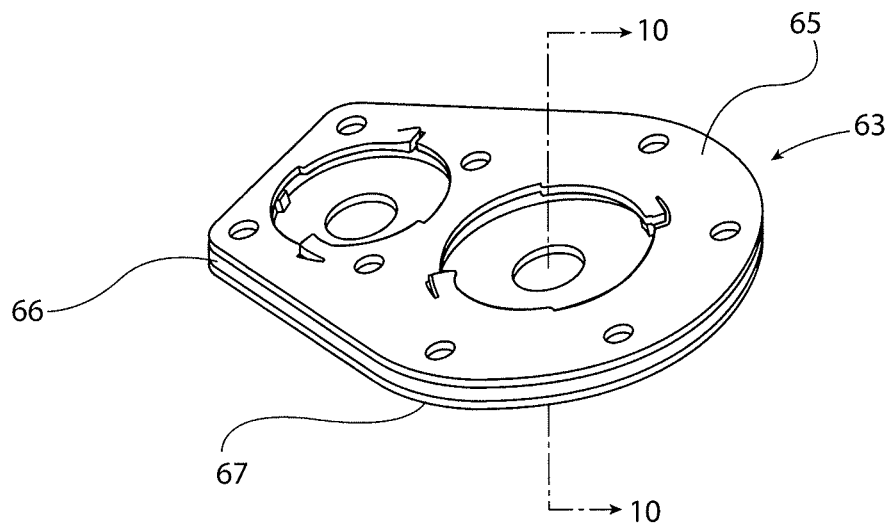
FIG. 9 is an isometric view of the assembled quick disconnect plate sandwich assembly illustrated in exploded form in FIG. 8.
Figure 10:
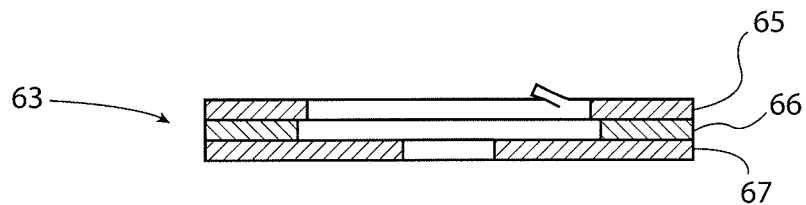
FIG. 10 is a sectional view of the assembled quick disconnect plate sandwich assembly taken at lines and arrows 10-10 in FIG. 9.
Figure 11:
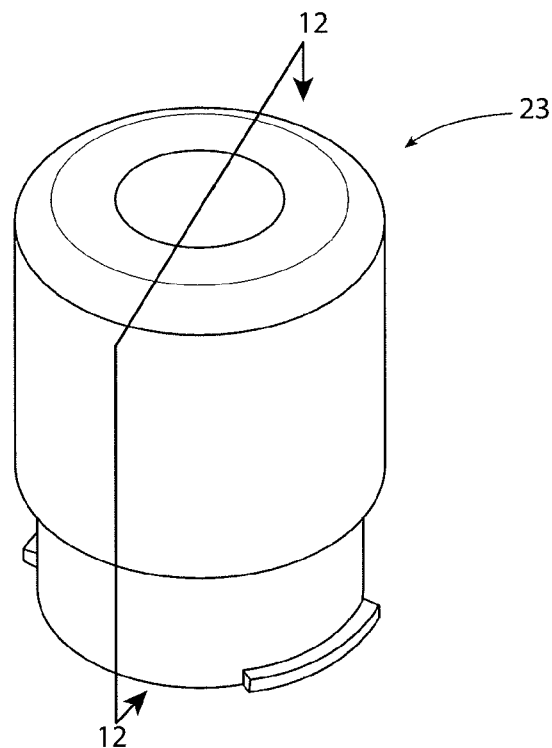
FIG. 11 is an isometric view of the quick disconnect liquid color outlet assembly shown in section in FIGS. 3 and 4.
Figure 12:
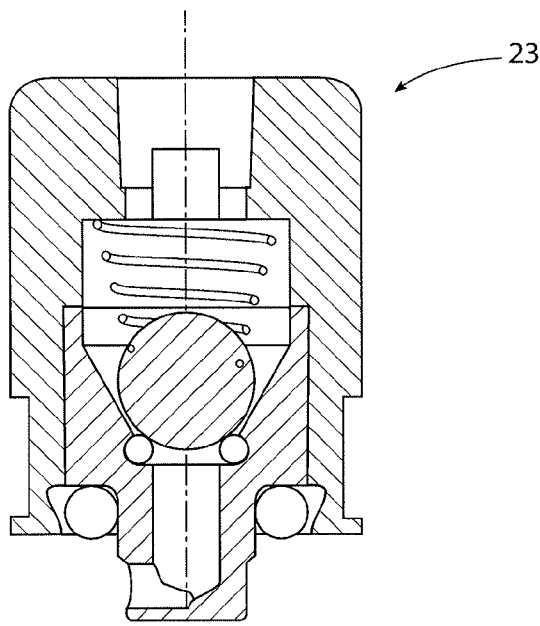
FIG. 12 is a sectional view of the quick disconnect liquid color outlet assembly taken at lines and arrows 12-12 in FIG. 11.

Referring to FIGS. 3, 4 and 7, a gasket 24 is sandwiched between an upper planar surface 112 of molded one piece lower body portion 20 and a part of the lower facing surface of drum lid 16, as best illustrated in FIG. 4.

A liquid color inlet conduit 26 extends downwardly from molded one piece lower body portion 20 and communicates with the open interior 98 of molded one piece lower body portion 20 via an inlet aperture 100 formed in molded one piece lower body portion 20. The open interior 98 and inlet aperture 100 formed in molded one piece lower body portion 20 are best illustrated at FIG. 7. A liquid color inlet check valve located at liquid color inlet 100 to molded lower body portion 20 is designated generally 28 in FIG. 4 and includes a liquid color inlet check valve ball 30, which is biased against a liquid color inlet check valve seat 34, which seat is preferably defined by an O-ring. Bias for liquid color inlet check valve ball 30 is provided by liquid color inlet check valve bias spring 102.

Liquid color inlet check valve ball 30 resides within and is movable freely with respect to a diaphragm return spring designated 32 in FIG. 4. Diaphragm return spring 32 is positioned between and rests against a shoulder 104 of a cylindrically shaped portion 106 of the open interior of one piece lower body portion 20. Shoulder portion 104 and cylindrical portion 106 are best illustrated in FIG. 7. Diaphragm return spring 32 is constrained at its upper end by contact with the underside of a diaphragm support cup 62. An upper surface of diaphragm support cup 62 facingly contacts a lower surface of diaphragm 24. Diaphragm support cup 62 includes a horizontal planar portion 108 and an annular portion 110 extending downwardly from portion 108. Annular portion 110 separates diaphragm return spring 32 from inlet check valve bias spring 102, as illustrated in FIG. 4.

As illustrated in FIGS. 3 and 4, the injection molded diaphragm pump with liquid color for quick release preferably further includes a slide potentiometer designated generally 36, with the potentiometer having a T-bar 40 for detecting the position of position sending pin 42. A spring 38 provides return bias for position sensing pin 42. A pumped color liquid outlet is designated 46, while the bottom interior surface of lid 16 is designated 48 and the top exterior surface of lid 16 is designated 50. O-rings 52 are provided to seal the quick disconnect inlet section 22 and the quick disconnect liquid color outlet assembly 23 of pump 14 relative to drum lid 16.

The pump assembly further includes a liquid color outlet shutoff valve designated generally 54, a liquid color outlet shutoff valve ball designated 56 and a liquid color outlet shutoff valve spring designated 58. A diaphragm support cup is designated 62 and a sandwich-like quick disconnect plate assembly is provided as 63, which includes quick disconnect retainer plate 65, quick disconnect spacer plate 66, and quick disconnect base plate 67. An optional gasket, not shown, may be interposed between upper surface 50 of drum lid 16 and a lower, unnumbered surface of quick disconnect base plate 67, which faces drum lid 16.

A microprocessor 68 actuates and operates solenoid valve 70, which supplies air as needed to the upper side of diaphragm 24 from a house air line 74. A voltage potential outlet signal line 76 works in conjunction with solenoid valve control signal input line 78 and solenoid valve output air line 80 to effectuate effective control of valve 70. A recess 84 formed in the upper surface of pump molded one-piece lower body portion 20 defines a channel 86 for flow of liquid color from a pumping section of the pump, defined generally by the structure underlying quick disconnect inlet section 22, to an outlet section of the pump defined generally by the structure underlying quick disconnect liquid color outlet assembly 23.

The following is claimed:

1. A liquid color container with a pneumatic pump, comprising:
   a) the container having a lid with an aperture therein;
   b) a molded plastic one-piece pump body portion within the container, the body portion having a planar upper surface adapted for flush mounting of the body portion to the underside of the lid, the body portion being connected to the underside of the lid, overlying the aperture, with the body portion planar upper surface parallel and flush with the underside of the lid;
   c) a diaphragm between the molded plastic one-piece pump body portion and the lid, overlying the aperture, being movable away from the lid responsively to pneumatic pressure applied to a first side of the diaphragm facing the lid and returning towards the lid upon relief of said pneumatic pressure;
   d) the molded plastic one-piece pump body portion having a valved conduit connected thereto for liquid color communication therethrough from the container interior to a second side of the diaphragm.

2. A liquid color container with a pneumatic pump comprising:
   a) the container having a lid with an aperture therein;
   b) a molded plastic one-piece pump body portion within the container and connected to the underside of the lid, overlying the aperture;
   c) a diaphragm between the molded plastic one-piece pump body portion and the lid, overlying the aperture, being movable away from the lid responsively to pneumatic pressure applied to a first side of the diaphragm facing the lid and returning towards the lid upon relief of said pneumatic pressure;
   d) the molded plastic one-piece pump body portion having a valved conduit connected thereto for liquid color communication upwardly therethrough from the container interior to a second side of the diaphragm;
   e) a potentiometer for sensing position of the diaphragm and providing a signal indicative thereof;
   f) a solenoid valve for supplying pressurized air to the first side of the diaphragm; and
   g) a microprocessor for receiving the signal from the potentiometer and regulating operation of the solenoid valve.

3. The liquid color container of claim 2 further comprising a housing for enclosing the potentiometer, connected to the lid and extending over the aperture, the housing having a passageway for air flow therethrough from the solenoid valve to the first side of the diaphragm.

4. The liquid color container with a pump of claim 3 wherein the molded plastic one-piece pump body portion within the container is polyethylene.

5. A pneumatically powered pump for liquid color, adapted to fit partially within a liquid color container, comprising:
   a) a pump body portion adapted to be mounted on the underside of a liquid color container lid, the body portion having a planar upper surface and being a single piece of molded plastic adapted to overly an aperture in the container lid, with the body portion planar surface being flush with the underside of the lid;
   b) a diaphragm contacting the molded plastic one-piece pump body portion and adapted to contact the lid and overlie the aperture, the diaphragm being movable away from the lid responsively to pneumatic pressure applied to a first side of the diaphragm facing the lid and moving towards the lid upon relief of said pneumatic pressure;
   c) the molded plastic one-piece pump body portion having the planar portion facingly contacting the diaphragm and including a valved conduit for liquid color communication therethrough from the container interior to a second side of the diaphragm.

* * * * *